US009798675B1

(12) United States Patent
Bean et al.

(10) Patent No.: US 9,798,675 B1
(45) Date of Patent: Oct. 24, 2017

(54) SYSTEM AND METHOD OF DETERMINING MEMORY OWNERSHIP ON CACHE LINE BASIS FOR DETECTING SELF-MODIFYING CODE INCLUDING CODE WITH LOOPING INSTRUCTIONS

(71) Applicant: VIA ALLIANCE SEMICONDUCTOR CO., LTD., Shanghai (CN)

(72) Inventors: Brent Bean, Austin, TX (US); Colin Eddy, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 15/156,391

(22) Filed: May 17, 2016

Related U.S. Application Data

(60) Provisional application No. 62/324,945, filed on Apr. 20, 2016.

(51) Int. Cl.
| | | |
|---|---|---|
| G06F 12/00 | (2006.01) | |
| G06F 12/109 | (2016.01) | |
| G06F 12/0893 | (2016.01) | |
| G06F 12/0875 | (2016.01) | |

(52) U.S. Cl.
CPC ........ *G06F 12/109* (2013.01); *G06F 12/0875* (2013.01); *G06F 12/0893* (2013.01); *G06F 2212/452* (2013.01); *G06F 2212/604* (2013.01); *G06F 2212/657* (2013.01)

(58) Field of Classification Search
None
See application file for complete search history.

(56) References Cited

U.S. PATENT DOCUMENTS

| | | | | |
|---|---|---|---|---|
| 6,009,516 | A * | 12/1999 | Steiss | G06F 9/3861 712/205 |
| 9,424,427 | B1 * | 8/2016 | Chiriac | G06F 21/566 |
| 2003/0135789 | A1 | 7/2003 | DeWitt, Jr. et al. | |
| 2009/0083715 | A1 | 3/2009 | DeWitt, Jr. et al. | |
| 2009/0164715 | A1 | 6/2009 | Astigarraga et al. | |
| 2012/0297146 | A1 * | 11/2012 | Guthrie | G06F 12/0815 711/141 |
| 2015/0324213 | A1 * | 11/2015 | Abdallah | G06F 9/45525 717/151 |

\* cited by examiner

*Primary Examiner* — John A Lane
(74) *Attorney, Agent, or Firm* — Gary Stanford; James W. Huffman

(57) ABSTRACT

A system and method of determining memory ownership on a cache line basis for detecting self-modifying code including code with looping instructions. An ownership queue includes multiple entries for determining memory ownership on a cache line basis. An ownership index and a wrap bit are determined for each cache line in the ownership queue, which are provided with each instruction derived from the same cache line. When an instruction is issued for execution, the ownership index provided with the instruction is used to access the corresponding entry in the ownership queue. If the instruction and entry wrap bits do not match, then an overwrite of the cache line is detected. The instruction is marked to invoke a first exception, which is performed when the instruction is ready to retire. The first exception flushes the processor, prevents the instruction from being retired, and re-fetches the instruction to continue processing.

22 Claims, 5 Drawing Sheets

SYSTEM AND METHOD OF DETERMINING MEMORY OWNERSHIP ON CACHE LINE BASIS FOR DETECTING SELF-MODIFYING CODE INCLUDING CODE WITH LOOPING INSTRUCTIONS

CROSS REFERENCE TO RELATED APPLICATION(S)

This application claims priority based on U.S. Provisional Application, Ser. No. 62/324,945, filed Apr. 20, 2016, which is hereby incorporated by reference in its entirety.

This application is related to the following U.S. Patent Applications, each of which has a common assignee and common inventors.

| SER. NO. | FILING DATE | TITLE |
|---|---|---|
| 15/156,403 | May 17, 2016 | SYSTEM AND METHOD OF DETERMINING MEMORY OWNERSHIP ON CACHE LINE BASIS FOR DETECTING SELF-MODIFYING CODE INCLUDING CODE WITH INSTRUCTION THAT OVERLAPS CACHE LINE BOUNDARIES |
| 15/156,416 | May 17, 2016 | SYSTEM AND METHOD OF DETERMINING MEMORY OWNERSHIP ON CACHE LINE BASIS FOR DETECTING SELF-MODIFYING CODE |
| 15/156,429 | May 17, 2016 | SYSTEM AND METHOD OF DETERMINING MEMORY OWNERSHIP ON CACHE LINE BASIS FOR DETECTING SELF-MODIFYING CODE INCLUDING MODIFICATION OF A CACHE LINE WITH AN EXECUTING INSTRUCTION |

BACKGROUND OF THE INVENTION

Field of the Invention

The present invention relates in general to memory ownership, and more particularly to determining memory ownership on a cache line basis that may be used for detecting self-modifying code including code with looping instructions.

Description of the Related Art

Self-modifying code (SMC) includes at least one instruction executed by a local processor that modifies another instruction or instruction sequence that is to be subsequently executed by the processor. SMC may include a sequence of code that modifies code that has just been executed, in which case the modified code is executed again with a newly modified function. SMC may further include the case in which code is modifying code just ahead and staying just in front of execution. Although SMC may not be as common today as in the past, many legacy programs include SMC and should be executed properly. A processor must be capable of detecting SMC and correcting operation to avoid improper results. The term "processor" as used herein refers to any type of processing unit, including a microprocessor, a central processing unit (CPU), a processing core, a microcontroller, etc. The term "processor" as used herein also includes any type of processor configuration, such as processing units integrated on a chip or integrated circuit (IC) including those incorporated within a system of a chip (SOC) or the like.

Modern processors often perform prefetch operations in which one or more lines of memory are read into an instruction cache (icache). The cache lines from the icache are then parsed into instructions that are forwarded for execution. In order to maximize efficiency, a fetch unit or the like attempts to fill the icache and keep it full to ensure that instructions are continuously available for execution. In order to maximize performance, it is usually desired to keep the execution pipelines as full as possible. Modern processors usually perform out-of-order (OOO) execution in which a later received instruction that is ready for execution may be executed before an earlier instruction that is not ready for execution. At least one problem with prefetch and OOO operation is that instructions that have been prefetched and forwarded for execution may be subsequently modified by SMC. Thus, an instruction that is already sent for execution may have missed the modification potentially causing improper or unintended operation.

Modern processors need to detect and/or prevent completion of stale instructions that were not intended to be executed since modified by code. Processors generally divide ownership of the memory into an instruction area owned by the icache and a data area owned by a data cache (dcache). The instruction area is supposed to contain only instructions for execution and the data area is supposed to be available for storing data and information for a software program. If the icache attempts to read from memory owned by the dcache, ownership must be transferred from the dcache which is a slow and tedious process which tends to serialize operation.

In conventional configurations, ownership was based on page boundaries. A common page size is 4 kilobytes (KB). Although 4 KB is not a significant amount of memory, SMC may cause thrashing of ownership between the icache and the dcache substantially reducing operating efficiency. One solution was to decrease ownership size to one-quarter page, such as 1 KB ownership granularity for a page size of 4 KB. It has been observed that even 1 KB ownership granularity was still problematic for SMC in many situations. Furthermore, larger page sizes are often used, such as 2 megabytes (MB) or even 1 gigabyte (GB), so that ownership granularity has remained a significant issue that reduces overall performance.

SUMMARY OF THE INVENTION

A processor that determines memory ownership on a cache line basis for detecting self-modifying code including code with looping instructions according to one embodiment includes an ownership queue, a fetch system, a processing front end, an overwrite detector, and an execution system. The ownership queue includes multiple entries for determining memory ownership on a cache line basis. The fetch system provides cache line data of multiple cache lines to the processing front end, determines an ownership index and a wrap bit for each cache line, and enters a corresponding cache line address, a corresponding ownership index and a corresponding wrap bit into an entry of the ownership queue for each cache line. The ownership index uniquely identifies each of a complete set of entries and the wrap bit distinguishes between sequential entries of the ownership queue having a common ownership index. The processing front end translates the cache line data from the cache lines into microinstructions and includes with each microinstruction an ownership index and a wrap bit that were determined for a corresponding entry of the ownership queue. The processing front end then issues each microinstruction for execution. The overwrite detector uses the ownership index provided with a microinstruction being issued to read a corresponding wrap bit of a corresponding entry of the ownership cache having the same ownership index, and causes the microinstruction being issued to be marked with a first exception when the wrap bit of the corresponding entry does not match the wrap bit of the microinstruction being issued. The execution system performs the first exception when a microinstruction that is marked with the first exception is ready to retire.

In one embodiment, the first exception causes the execution system to flush the processor, to prevent an instruction that caused the first exception from being retired, and to cause the fetch system to re-fetch from an instruction cache the instruction that caused the first exception.

The processing front end may include a decoder that parses the cache line data into macroinstructions, a translator that translates the macroinstructions into microinstructions, and a loop queue coupled between the decoder and the translator for storing macroinstructions from the translator for processing by the translator. The processing front end may further include a loop detector, coupled to the translator and to the loop queue, that detects a loop including a sequence of macroinstructions at least partially within the loop queue and that causes the translator to repeatedly retrieve and translate the sequence of macroinstructions from the loop queue until the loop is completed. After a loop is detected, the fetch system may continues to provide cache line data to the decoder and to fill entries of the ownership queue until the loop is completed or until the decoder is full. The decoder may includes with each macroinstruction a corresponding ownership index and a corresponding wrap bit, in which the translator, which translates each macroinstruction into at least one microinstruction, further includes a corresponding ownership index and a corresponding wrap bit with each of microinstruction.

The fetch system may determine the ownership index as a binary count value that is incremented for each entry entered in the ownership queue for a total count that is at least a total number of entries of the ownership queue. In one embodiment, a most significant bit of the ownership index is the wrap bit. In one embodiment, the wrap bit toggles between first and second values after each iteration of a complete set of entries of the ownership queue.

A method of determining memory ownership on a cache line basis for detecting self-modifying code including code with looping instructions according to one embodiment includes fetching cache lines in which each cache line includes a cache line address and cache line data, and for each cache line, determining an ownership index that uniquely identifies each of a complete set entries of an ownership queue, and determining a wrap bit that distinguishes between sequential entries of the ownership queue having a common ownership index, pushing each cache line, a corresponding ownership index and a corresponding wrap bit into an entry of an ownership queue, translating the cache line data from the cache lines into microinstructions, and including with each translated microinstruction an ownership index and a wrap bit that were determined for a corresponding one of the entries of the ownership queue that stores a cache line from which the translated microinstruction was derived, issuing each microinstruction for execution, and using an ownership index provided with each microinstruction being issued to read a corresponding wrap bit of a corresponding entry of the ownership cache having the same ownership index, marking each microinstruction being issued with a first exception when the wrap bit of the corresponding entry of the ownership queue does not match the wrap bit including with the microinstruction being issued, and performing a first exception when a microinstruction is marked to invoke the first exception is ready to retire.

The performing a first exception may include flushing the processor, preventing the microinstruction that invoked the first exception from retiring, and re-fetching the microinstruction that invoked the first exception. The method may include parsing the cache line data into macroinstructions by a decoder, storing the macroinstructions into a loop queue, and translating the macroinstructions from the loop queue into microinstructions. The method may include detecting a loop including a sequence of macroinstructions at least partially located within the loop queue, and repeatedly retrieving and translating the sequence of macroinstructions from the loop queue until the loop is completed. The method may include continuously fetching and pushing to fill entries of the ownership queue until the loop is completed or until a decoder is full.

The method may include including with each macroinstruction a corresponding ownership index and a corresponding wrap bit, and for each microinstruction derived from a macroinstruction, including the corresponding ownership index and the corresponding wrap bit of the macroinstruction. The method may include determining the ownership index as a binary count value that is incremented for each entry entered in the ownership queue for a total count that is at least a total number of entries of the ownership queue, and determining the wrap bit as a most significant bit of the ownership index. The method may include determining a wrap bit by toggling between first and second values after each iteration of a complete set of entries of the ownership queue.

BRIEF DESCRIPTION OF THE DRAWINGS

The benefits, features, and advantages of the present invention will become better understood with regard to the following description, and accompanying drawings where.

DETAILED DESCRIPTION

The inventors have recognized the problems of memory ownership in view of self-modifying code (SMC). They have therefore developed a system and method of establishing memory ownership on a cache line basis using an ownership queue which may be used for detecting SMC including code with looping instructions. When the code includes looping instructions, the looping instructions may be pulled from a loop queue or the like rather than from the instruction cache which may result in an overwrite in the ownership queue. An overwrite in the ownership queue results in an inability to identify SMC that modifies a cache line that has been overwritten in the ownership queue because of the looping instructions. As described herein, the ownership queue includes a wrap bit for each cache line entry in the ownership queue, in which the wrap bit is copied with each instruction derived from that same cache line with the same wrap bit in the ownership queue. When an instruction that is issued for processing has a wrap bit that does not match the wrap bit of the corresponding entry in the ownership queue, then overwrite of the corresponding cache line is detected and a first exception is invoked to remedy the condition.

Figure 1:
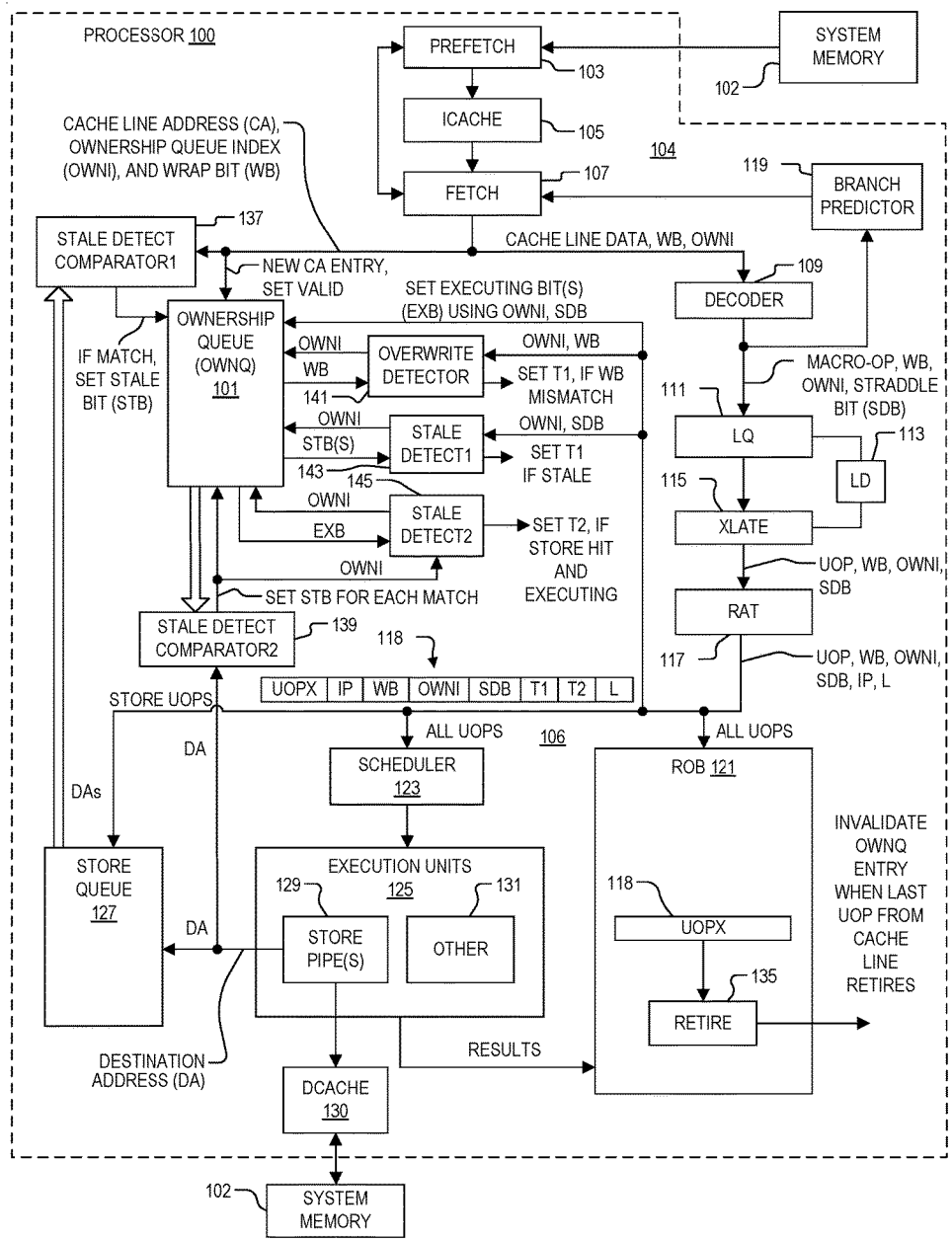
FIG. 1 is a simplified block diagram of a processor incorporating an ownership queue implemented according to one embodiment for establishing ownership between data and instructions.

FIG. 1 is a simplified block diagram of a processor 100 incorporating an ownership queue (OWNQ) 101 implemented according to one embodiment for establishing ownership between data and instructions. The standard instruction set architecture (ISA) of the processor 100 may be an x86 macroarchitecture in which it can correctly execute a majority of the application programs that are designed to be executed on an x86 processor. An application program is correctly executed if its expected results are obtained. In particular, the processor 100 executes instructions of the x86 instruction set and includes the x86 user-visible register set. The present invention is not limited to x86 architectures, however, in which the processor 100 may be according to any alternative ISA as known by those of ordinary skill in the art. The processor 100 is shown coupled to an external system memory 102 that stores software programs, applications, data, and other information as understood by those of ordinary skill in the art. The processor 100 may include a bus interface unit (BIU) or the like (not shown) for interfacing the memory 102. In an SOC configuration, the processor 100 and the system memory 102 may be incorporated on a common IC along with other processing blocks (not shown).

The processor 100 includes a processing system including a processing front end 104 and an execution system 106 along with other processing modules as further described herein. The processing front end 104 includes a hardware prefetch (PREFETCH) engine 103, an instruction cache (ICACHE) 105, a fetch unit 107, a decoder 109, a loop queue (LQ) 111, a loop detector (LD) 113, an instruction translator (XLATE) 115, a register alias table (RAT) 117, and a branch predictor 119. The execution system 106 generally includes a reorder buffer (ROB) 121, a scheduler 123 (otherwise known as reservation stations), execution units 125, and a store queue 127. The execution units 125 include at least one store pipeline 129 along with other execution units 131, such as one or more integer (INT) units, one or more floating point (or media) units, at least one load pipeline, etc. In one embodiment, the load and store pipelines may be incorporated within a memory order buffer (MOB) (not shown) or the like. The store pipeline 129 may further be interfaced with a data cache (DCACHE) 130, which includes one or more levels of data caches, such as a level-1 (L1) cache, a level-2 (L2) cache, etc. The data cache 130 may also interface the system memory 102. The ROB 121 is shown further including a retire module 135 described further herein.

Additional ownership logic and circuitry is provided along with the OWNQ 101 for making ownership decisions and detecting self-modifying code (SMC) as further described herein. The additional logic and circuitry includes a first stale detect comparator (STALE DETECT COMPARATOR1) 137, a second stale detect comparator (STALE DETECT COMPARATOR2) 139, an overwrite detector 141, a first stale detector (STALE DETECT1) 143, and a second stale detector (STALE DETECT2) 145.

In general operation, the prefetch engine 103 fetches program information from the system memory 102 and stores the information into cache lines within the icache 105. Each cache line may have a specified length, such as 64 bytes, although the cache line size is arbitrary and may be different in other configurations. The fetch unit 107 retrieves each cache line from the icache 105 and provides the cache line data to the decoder 109 for parsing the data into instruction information. The decoder 109 divides and formats the cache line data into instructions and corresponding information associated with each instruction, such as operands or the like. For example, if the processor 100 supports the x86 ISA, then the instructions may be x86 instructions. Each ISA instruction is referred to herein as a macroinstruction or macro-operation (macro-op) according to the supported ISA of the processor 100. The macro-ops from the decoder 109 are then pushed into to the LQ 111, and from there are provided to the XLATE 115. The XLATE 115 translates each macro-op into one or more corresponding microinstructions, or micro-operations (uops), which are configured according to the native instruction set of the processor 100. An instruction pointer (IP) is also determined for and provided with each uop as it is passed to the ROB 121. The uops are provided to the RAT 117, which generates dependency information for each uop based on its program order, on the operand sources it specifies, and on renaming information.

Each uop (along with associated information) from the RAT 117 is pushed out in program order to the ROB 121 and to the scheduler 123. The scheduler 123 includes at least one queue that holds each uop and its dependency information received from the RAT 117. The scheduler 123 dispatches received uops to corresponding ones of the execution units 125 when they are ready to be executed. The store uops are provided to the store pipe 129 for processing, whereas all other instruction types are provided to the appropriate unit within the other execution units 131 (e.g., integer instructions are provided to an integer execution unit, media instructions are provided to the media execution unit, etc.). A uop is considered ready for execution when all of its dependencies are resolved. In conjunction with dispatching a uop, the RAT 117 allocates an entry in the ROB 121 for the uop. Thus, the uops are allocated in program order into the ROB 121, which may be configured as a circular queue to ensure that the uops are retired in program order. The RAT 117 also provides the corresponding IP along with corresponding dependency information to the ROB 117 for storage in the uop's entry therein for storage of operands and results. In one embodiment, a separate physical file register (PRF) may be included (not shown), in which the RAT 117 may further allocate or map one or more physical registers within the PRF for each uop for storage of the operands and results.

The results of the execution units 211 may be fed back to the ROB 121, which updates corresponding fields and/or updates architectural registers or the like. In a PRF embodiment, the ROB 121 includes pointers that are used to update corresponding registers within the PRF. In one embodiment, the RAT 117 maps architectural registers to physical registers in the PRF and updates pointers or the like (not shown) in the ROB 121 corresponding to the uops. The pointers in the ROB 121 may be updated during or after execution, and the pointers are used to update contents of registers within the PRF during operation. The retire module 135 within the ROB 121 ultimately retires the uops in program order to ensure proper operation in accordance with the original instructions of the software program or application. When a uop has been marked or otherwise indicated as having an exception, then the retire module 135 takes the appropriate action in accordance with the exception type as further described herein.

The store uops that are pushed into the store pipe 129 for execution are also pushed into a corresponding entry within the store queue 127. When initially pushed in from the RAT 117, the addresses of operands of the store uop, including the destination address (DA), may not be known. When the store pipe 129 determines the destination address DA of a store uop being executed, it provides the DA to the corresponding entry within the store queue 127.

The branch predictor 119 detects branch macro-ops output from the decoder 109 and/or within the LQ 111 and makes predictions regarding whether or not the branch will be taken. The branch predictor 119 communicates with the fetch unit 107, which may branch to a different location within the icache 105 depending upon the branch prediction. The fetch unit 107 and the prefetch engine 103 are also in communication, so that if the branch location is not within the icache 105, the prefetch engine 103 retrieves the corresponding location from the system memory 102 into the icache 105.

During normal operation, macro-ops from the decoder 109 are buffered through the LQ 111 and provided to the XLATE 115. If the LD 113 detects multiple iterations of instructions in a loop, which may be either wholly or at least partially located in the LQ 111, then the LD 113 identifies a loop in which the instructions of the loop are instead repeatedly pulled from the LQ 111 rather than from the icache 105. In one embodiment, the LD 113 detects a loop when a predetermined number of loop iterations occur. In a specific embodiment, the number of iterations is 24, although any suitable number of iterations may be used. In one embodiment, the LD 113 assumes that the loop will continue indefinitely, so that it continues to repeat execution of the loop until the prediction is incorrect (loop branch not taken), in which case the system is flushed and the fetch unit 107 begins retrieving information at the next location after the loop within the icache 105, or possibly another branch location.

In the case in which the LD 113 has detected a loop, the fetch unit 107 may continue to retrieve and push cache lines into a buffer within the decoder 109 until it is full, and then the fetch operation may be temporarily stalled. In one embodiment, the fetch unit 107 repeatedly retrieves the cache lines of the loop while a loop is detected by the LD 113. In another embodiment, the fetch unit 107 may be informed that the LD 113 has detected a loop and instead begins fetching outside the loop, such as beginning with the next sequential location after the loop. In either case, the decoder 109 fills up while a loop is active.

When the fetch unit 107 pushes cache line data into the decoder 109, it also pushes the corresponding cache line address (CA) into an entry of the OWNQ 101 and marks the entry as valid. The OWNQ 101 may be configured as a circular buffer or the like including push and pop pointers for distinguishing between allocated and de-allocated entries. In another embodiment, each entry of the OWNQ 101 includes a valid bit or value for distinguishing between valid and invalid entries, in which the valid bit is set (set=valid) for each new entry pushed into the OWNQ 101. In one embodiment, the fetch unit 107 determines an ownership index (OWNI) and a wrap bit (WB) that correspond with the cache line address CA of the cache line, in which the corresponding OWNI and WB values are pushed along with CA into the corresponding entry of the OWNQ 101. The OWNI uniquely identifies each entry of the OWNQ 101. As described further herein, the WB is used to detect an overwrite within the OWNQ 101.

The RAT 117 is configured to identify the last uop of each cache line using corresponding indexes OWNI, and to tag the uop as the last uop of a cache line so that this information is passed to the ROB 121. When the retire module 135 retires a uop, the retire module 135 determines whether the uop being retired is tagged as the last uop of a given cache line within the OWNQ 101. If so, then the retire module 135 instructs the OWNQ 101 to "pop" the corresponding entry or to simply invalidate the entry within the OWNQ 101.

When the fetch unit 107 pushes each new CA into an entry of the OWNQ 101, the CA is also provided to an input of the first stale detect comparator 137. The stale detect comparator 137 also reads each of the valid destination addresses (DAs) from the store queue 127, and compares each DA with the new CA to determine if there is a match. The stale detect comparator 137 may be referred to as the new entry comparator. If the CA matches any DA, then a corresponding stale bit (STB) of the entry in the OWNQ 101 is set. The stale bit STB indicates that a store uop and the cache line have "hit" each other meaning that the store instruction has modified or will modify the cache line. Whenever a store instruction and a cache line stored in a valid entry of the OWNQ 101 hit or collide with each other, then any instruction derived from that cache line may be invalid. Any uop that is from that cache line is potentially invalid (or "stale") as indicated by setting the stale bit STB.

The OWNI and WB values are further attached to or otherwise associated with the corresponding cache line data provided to the decoder 109. The decoder 109 includes a corresponding WB and OWNI value with each macro-op to identify the corresponding cache line from which the macro-op was retrieved by the decoder 109. If multiple macro-ops are pulled from the same cache line, then each of the macro-ops from that same cache line are assigned the same WB and OWNI. In one embodiment, the macro-ops are not aligned with the cache lines of the icache 105, so that each macro-op further includes a "straddle" bit (SDB). The SDB identifies the case in which a macro-op straddles two different cache lines in which the macro-op starts on one cache line and ends on the next sequential cache line. If so, then the decoder 109 attaches the OWNI of the first line and sets true the straddle bit SDB for the macro-op. If the macro-op is contained within a single cache line, then its SDB is set false. Each macro-op includes corresponding WB, OWNI and SDB values when pushed into XLATE 115. In each case in which a bit or field is set either true or false, the bit or field (which includes at least one bit) is set true by setting it to a logic "1" and is set false to a logic "0".

The XLATE 115 translates each macro-op into one or more uops. During translation, each uop derived from a macro-op maintains the same WB, OWNI and SDB values of the macro-op from which it was derived. Thus, if a macro-op is translated to 3 separate uops, then each of the 3 uops retain the same WB, OWNI and SDB values as the original macro-op. The WB, OWNI and SDB values are retained by each uop passing through the RAT 117.

An exemplary uop "uopx" is shown at 118 and represents any one of the uops defined for the processor 100 being pushed out of the RAT 117 and into the ROB 121 and the scheduler 123. Each uop includes multiple fields to facilitate operation and execution of a corresponding uop processed by the execution system 106 of the processor 100. One or more fields (not shown) identify the particular instruction and instruction type along with any associated operands, such as immediate operands, addresses, storage locations, register indexes, etc. Additional fields are provided to store the instruction pointer IP, the wrap bit WB, the ownership index OWNI, and the straddle bit SDB. As further described herein, each uop further includes a field T1 for indicating the type 1 exception, a field T2 for indicating the type 2 exception, and a field L indicating whether the instruction is the last uop of a cache line as marked by the RAT 117.

When each uop is output from the RAT 117 and pushed into the ROB 121 and the scheduler 123, the RAT 117 uses the index value OWNI provided with the uop to access the corresponding entry within the OWNQ 101, and then to set an executing bit (EXB) of the accessed entry. If the SDB of the uop is also true indicating that it is a straddle instruction, then the RAT 117 also sets the EXB of the next sequential entry within the OWNQ 101. As further described herein, the EXB of the entry is used to detect a subsequent hit by a store uop that was otherwise not detected as stale.

When each uop is output from the RAT 117, the overwrite detector 141 uses the included index value OWNI of the uop to access the corresponding entry within the OWNQ 101 and to read the WB value of the accessed entry. If the WB value of the uop does not match the WB of the corresponding entry within the OWNQ 101, then an overwrite has occurred and the overwrite detector 141 sets the T1 bit (or otherwise marks the T1 field as true) of the uop indicating that a first exception type, or type 1 exception, is to be performed upon retirement of the uop. In one embodiment, the T1 bit may be set by the overwrite detector 141 upon issuance of the uop before it has been pushed into the ROB 121. In another embodiment, the T1 bit of the entry in the ROB 121 is set when being pushed into the ROB 121 or thereafter either by the overwrite detector 141 or by the ROB 121 in response to an indication by the overwrite detector 141. A WB mismatch generally indicates that a loop has caused an overwrite within the OWNQ 101 such that SMC may no longer be detected for the corresponding cache line. The retire module 135 detects that T1 is set indicating that the uop corresponding to the uop entry within the ROB 121 has been marked with the type 1 exception. An overwrite means that an entry in the OWNQ 101 has been overwritten so that SMC involving the corresponding cache line might become undetectable causing erroneous results. As further described herein, the type 1 exception flushes the machine to prevent the erroneous condition.

When each uop is output from the RAT 117, the first stale detector 143 uses the included OWNI of the uop to access the corresponding entry within the OWNQ 101 and to read the stale bit STB of the accessed entry. Also, if the straddle bit SDB of the uop is true, then the first stale detector 143 also reads the stale bit STB of the next sequential entry within the OWNQ 101. If the STB of the entry in the OWNQ 101 is true, or if the uop is a straddle instruction as specified by the SDB and the STB of the next sequential entry in the OWNQ 101 is true, then the first stale detector 143 marks the uop with the type 1 exception by setting the T1 field of the uop as true (or by setting the T1 bit). The stale detector 143 may be referred to as the issuing stale detector that detects potentially invalid instructions when issued. As with the case of the overwrite detector 141, the T1 field is set true either by the first stale detector 143 or by the ROB 121 before, during or after being pushed into an entry of the ROB 121. As previously noted, the stale bit STB indicates that the cache line has been modified by a store uop so that the instruction may be invalid.

Each time that the store pipe 129 generates a destination address (DA) for a corresponding store uop, the DA is not only provided to update a corresponding entry within the store queue 127, it is also provided to an input of the second stale detect comparator 139. The stale detect comparator 139 also accesses all of the valid cache line addresses, or CAs, provided within the OWNQ 101, and compares the new DA with each of the valid CAs in the OWNQ 101. The stale detect comparator 139 may be referred to as the new destination address comparator. If there is a match, then the stale detect comparator 139 sets true the corresponding stale bit STB of that entry in the OWNQ 101. Furthermore, when there is a match detected by the stale detect comparator 139, the corresponding index OWNI is provided to an input of the second stale detector 145. The stale detector 145 accesses the corresponding entry within the OWNQ 101 and reads the executing bit EXB of that entry. If the executing bit EXB of that entry is set true, then the stale detector 145 causes the store uop entry within the ROB 121 to be marked with the second exception type, or type 2 exception, by setting the T2 field of the entry as true. The stale detector 145 may be referred to as the executing stale detector that detects potentially invalid instructions that are executing. The stale detector 145 may access the store uop entry within the ROB 121 directly to set T2 or may otherwise indicate to the ROB 121 to set T2 in response.

A depiction of the exemplary uop 118 associated with a particular uopx within the ROB 121 is shown in simplified form. Each individual uop entry includes the field T1 for indicating the type 1 exception, the field T2 for indicating the type 2 exception, and the field L indicating whether the instruction is the last uop of a cache line as marked by the RAT 117. The L field is set true if the uop is the last uop of a cache line, and is otherwise set false. The retire module 135 detects the T1 and T2 fields of the uop entry within the ROB 121 (ROB entry) for that uop, and performs or otherwise initiates the corresponding exception routine or process. It is noted, however, that any uop, including store uops, may be marked with the type 1 exception T1, but that only store uops are marked with the type 2 exception T2.

The retire module 135 detects when each uop is ready to retire, such as when the uop is the oldest instruction in the ROB 121. When a uop is ready to retire, the retire module 135 further detects the T1, T2 and L fields of the corresponding uop entry. If the T1 field is true for a uop, then the retire module 135 invokes a type 1 exception for that uop, and if the T2 field is true, then the retire module 135 invokes a type 2 exception for the uop. If T1 and T2 fields are false and the L field is true, then the retire module 135 instructs the OWNQ 101 to "pop" the corresponding entry or to simply invalidate the entry within the OWNQ 101, which effectively removes the entire cache line from the OWNQ 101.

In the event of a type 1 exception indicated for the oldest uop in the ROB (and thus ready to retire), the ROB 121 broadcasts a corresponding exception signal throughout the processor 100 and the processing system is flushed. In this manner, any macro-ops and uops in the execution pipeline are effectively invalidated including the uop that caused the exception. When the type 1 exception occurs, all unretired uops are flushed, including any unretired store uops in the store queue 127. The retired store uops, however, stay in the store queue 127 until their data is committed to the memory hierarchy (e.g., the data cache 130 and/or the system memory 102). The uop that caused the type 1 exception is not allowed to retire, and the corresponding IP (instruction pointer) recorded within the ROB 121 for that uop may be used to access the location of that uop in the icache 105. The prefetch engine 103 and the fetch unit 107 are both temporarily stalled. The processor 100 traps to an exception routine in a microcode ROM (not shown) of the processor 100 with a corresponding exception code indicating the type of exception. Once the processing system is flushed, the exception routine retrieves the IP and forwards it to the fetch unit 107 to re-fetch the macro-op that corresponds with the uop that caused the exception.

The type 2 exception for a store uop is similar to the type 1 exception for other uop types. In this case, however, the store uop is allowed to retire so that it completes its execution and updates the memory location identified by its destination address. Since the memory location was previously owned by the icache 105, and the store uop is a data operation that needs to be owned by the data cache 130 within the processor 100, a snoop is initiated to invalidate the corresponding cache line in the icache 105. The memory modification and invalidation is guaranteed to occur during the exception. The exception routine for the type 2 exception then flushes the machine similar to the type 1 exception, and then accesses and forwards the IP to the fetch to restart from that location. Since the store uop that caused the type 2 exception was allowed to complete, the IP was incremented to the next instruction after the store uop in the icache 105 and operation continues from that point just after the store instruction.

Figure 2:
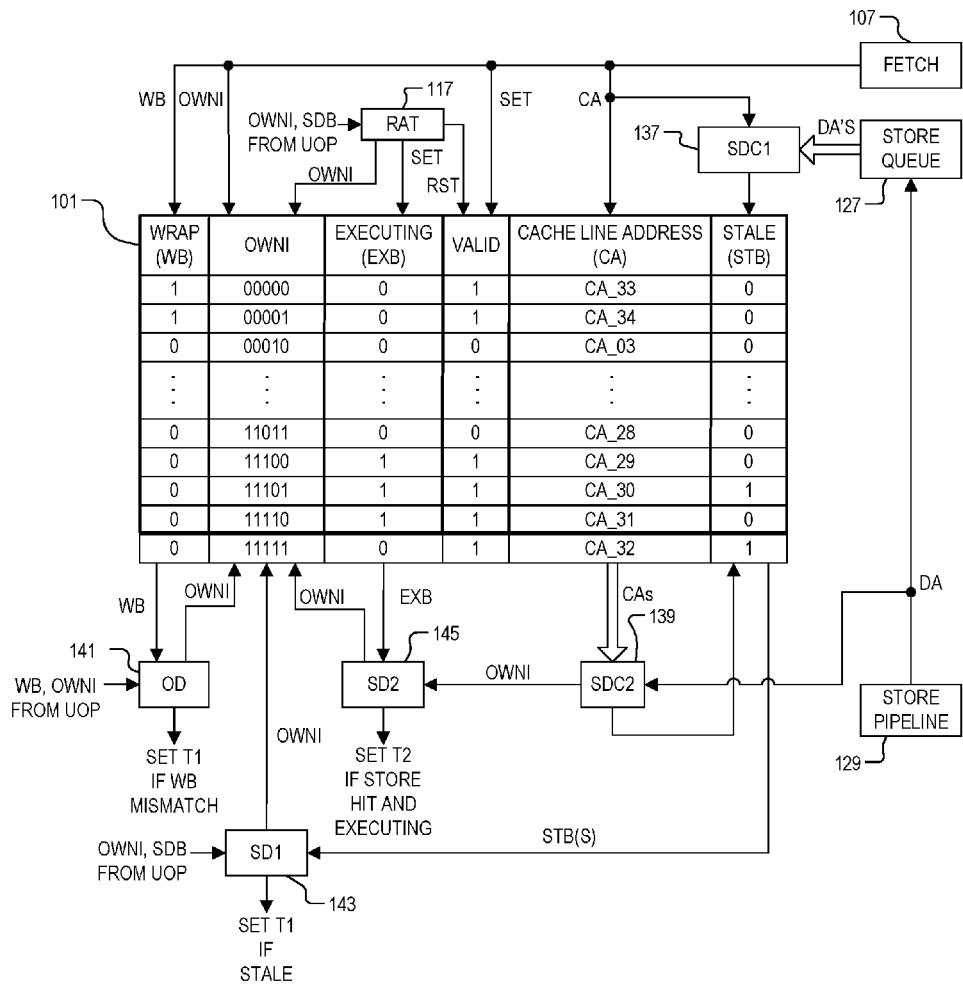
FIG. 2 is a simplified block diagram of the ownership queue of FIG. 1 along with corresponding interfaces with other ownership processing modules implemented according to one embodiment.

FIG. 2 is a simplified block diagram of the OWNQ 101 along with corresponding interfaces with other ownership processing modules implemented according to one embodiment. The OWNQ 101 includes multiple entries, in which each entry includes a WRAP field for storing a wrap bit WB, an OWNI field for storing a corresponding index value, an executing field for storing a corresponding executing bit EXB, a valid field for storing a valid bit, a cache line address field for storing a corresponding cache line address CA, and a stale field for storing a corresponding stale bit STB.

In one embodiment, the OWNI is a count value that is incremented for each entry pushed into the OWNQ 101. Also, to ensure that each entry in the OWNQ 101 has a unique index value OWNI, the number of bits B of the OWNI corresponds with the number of entries N of the OWNQ 101, such as $2^B \geq N$. For example, as shown in FIG. 2, the number of entries of the OWNQ 101 is N=32, and the number of bits of OWNI is 5. In one embodiment, the fetch unit 107 determines the wrap bit WB in a similar manner as an additional most significant bit (MSB) of the OWNI. In this manner, WB is 0b (in which "b" denotes a binary value) while OWNI counts from 0 to a maximum value indicative of the total number of entries of the OWNQ 101, and then WB is 1b while OWNI is reset back to 0 and counted up again to the maximum value. In other words, WB is toggled between two values for each complete pass of the OWNQ 101. The total number of entries may be less than the total possible number of entries for the number of bits B of the OWNI. For example, for a total of 26 entries, WB|OWNI counts from 0|00000b to 0|11001b in a first iteration (OWNI counts from 0 to 25 decimal with WB=0), and then counts from 1|00000b to 1|11001b in a second iteration (OWNI counts from 0 to 25 decimal with WB=1), and repeats in this manner.

As previously described, the fetch unit 107 inserts a new cache line address CA into the cache line address field, sets the corresponding valid bit in the valid field of the entry, determines and inserts the corresponding OWNI index into the OWNI field, and determines and inserts the corresponding wrap bit WB into the WRAP field. The new CA address being pushed in is provided to an input of the stale detect comparator (SDC1) 137, which also receives the destination addresses (DAs) from the store queue 127. If there is a match between the new CA and any of the DAs from the store queue 127, the corresponding stale bit within the stale field is set true. When each uop issues from the RAT 117, it uses the OWNI index of the uop to access the corresponding entry within the OWNQ 101 to set the corresponding executing bit EXB for that entry. Also, if the SDB of the uop is set indicating a straddle uop, then the RAT 117 accesses the next entry within the OWNQ 101 and sets corresponding executing bit EXB for that entry as well. When the last uop of a cache line is retired, the ROB 121 accesses the corresponding entry within the OWNQ 101 and resets or clears the valid bit.

The store pipeline 129 determines the destination address (DA) for each store uop and stores the DA in the corresponding entry within the store queue 127. The DA is also provided to the second stale detect comparator (SDC2) 139, which accesses the cache line addresses (CAs) from the OWNQ 101. If the newly determined DA matches any of the CAs from the OWNQ 101, the stale detect comparator 139 sets the stale bit in the corresponding entry of the OWNQ 101. Also, the matching index value OWNI is provided to the second stale detector (SD2) 145, which uses the OWNI value to access the corresponding entry within the OWNQ 101 to access the corresponding executing bit EXB. If the EXB of the corresponding entry in the OWNQ 101 is set true, then the stale detector 145 marks the entry of the colliding store uop (or causes it to be marked) in the ROB 121 with a type 2 exception.

As previously described, the overwrite detector (OD) 141 receives the WB and OWNI values from the uop issuing from the RAT 117, and uses the OWNI to access the WB of the corresponding entry within the OWNQ 101. If the WB of the corresponding entry within the OWNQ 101 does not match the WB from the uop, then the overwrite detector 141 marks the uop (or otherwise causes it to be marked) with a type 1 exception. Also, the first stale detector (SD1) 143 receives the OWNI and SDB values from the uop issuing from the RAT 117, and uses the OWNI to access the STB bit of the corresponding entry within the OWNQ 101. If the SDB of the uop is also true indicating a straddle uop, then the stale detector 143 accesses the STB of the next sequential entry of the OWNQ 101. If either STB of the accessed entries is set true, then the stale detector 143 marks the uop (or otherwise causes it to be marked) with a type 1 exception.

A first entry shown at the top of the OWNQ 101 has a wrap bit WB=1b, an index OWNI of 00000b, an executing bit EXB=0b, a valid bit=1b, a corresponding cache line address CA_33, and a stale bit STB=0b. A second entry in the OWNQ 101 just below the first entry has a wrap bit WB=1b, an index OWNI of 00001b, an executing bit EXB=0b, a valid bit=1b, a corresponding cache line address CA_34, and a stale bit STB=0b. A third entry in the OWNQ 101 just below the second entry has a wrap bit WB=0b, an index OWNI of 00010b, an executing bit EXB=0b, a valid bit=0b, a corresponding cache line address CA_03, and a stale bit STB=0b. Towards the end of the OWNQ 101, the last 5 entries with cache line addresses CA_28 thru CA_32 and corresponding OWNI indexes of 11011b-11111b, respectively. The entry with cache line address CA_28 has executing, valid and stale bits=0b. The next three entries with cache line addresses CA_29-CA_31 each have executing and valid bits=1b. The entries with cache line addresses CA_29 and CA_31 have stable bits STB=0b, but the entry with cache line address CA_30 has its stable bit STB=1b. The last entry with cache line address CA_32 is valid but not executing yet, but is also marked as stale.

In a first pass, cache line addresses CA_1 thru CA_32 filled the OWNQ 101 with wrap bit WB=0b. A second pass has been started, in which the first two entries of the first pass have been overwritten with two entries with the cache line addresses CA_33 and CA_34 and OWNI indexes of 00000b and 00001b, respectively, each with wrap bit WB=1b. These new entries (33 and 34) are valid but do not yet have any uops executing. The $3^{rd}$ through $28^{th}$ entries have been invalidated (possibly completed and invalided). The $29^{th}$ and $31^{st}$ entries are valid and each has at least one uop executing. The $30^{th}$ entry is valid and has at least one uop still executing, but has been marked as stale. The $32^{nd}$ entry does not have a uop that has issued from the RAT 117 so that it is not yet set as executing, but its stale bit is already set indicating a collision or hit with a store instruction.

Once the fetch unit 107 counts the OWNI value up to 11111b while WB=0b as indicated by the last entry in the OWNQ 101 with cache line address CA_32 (e.g., a first pass), it sets WB=1b and restarts the count back to OWNI=00000b as indicated by the first entry with cache line address CA_33 (e.g., beginning a second pass). WB remains at 1b for the next 31 entries that are loaded by the fetch unit 107 until the OWNI index resets back to 00000b, and operation repeats in this manner. When a loop has been detected such that LQ 111 no longer pulls macro-ops from the decoder 109, yet the fetch unit 107 continues to load the OWNQ 101 and the decoder 109 with cache lines from the icache 105, it is possible that an entry within the OWNQ 101 that corresponds with a loop instruction is overwritten by the fetch unit 107. In that case, the processor 100 may no longer be able to detect SMC for that cache line. The WB value of a uop issuing from the RAT 117 that is within the loop has a wrap bit that is no longer the same as the WB of the overwritten entry within the OWNQ 101. In the case of non-matching WB values between the issuing uop and its corresponding entry in the OWNQ 101, the overwrite detector 141 detects overwritten cache line and marks the uop (or causes it to be marked) with the type 1 exception. This is true even of the entry in the OWNQ 101 has already been marked as invalid or otherwise popped from the queue. An invalid or popped entry remains in the OWNQ 101 until overwritten.

Figure 3:
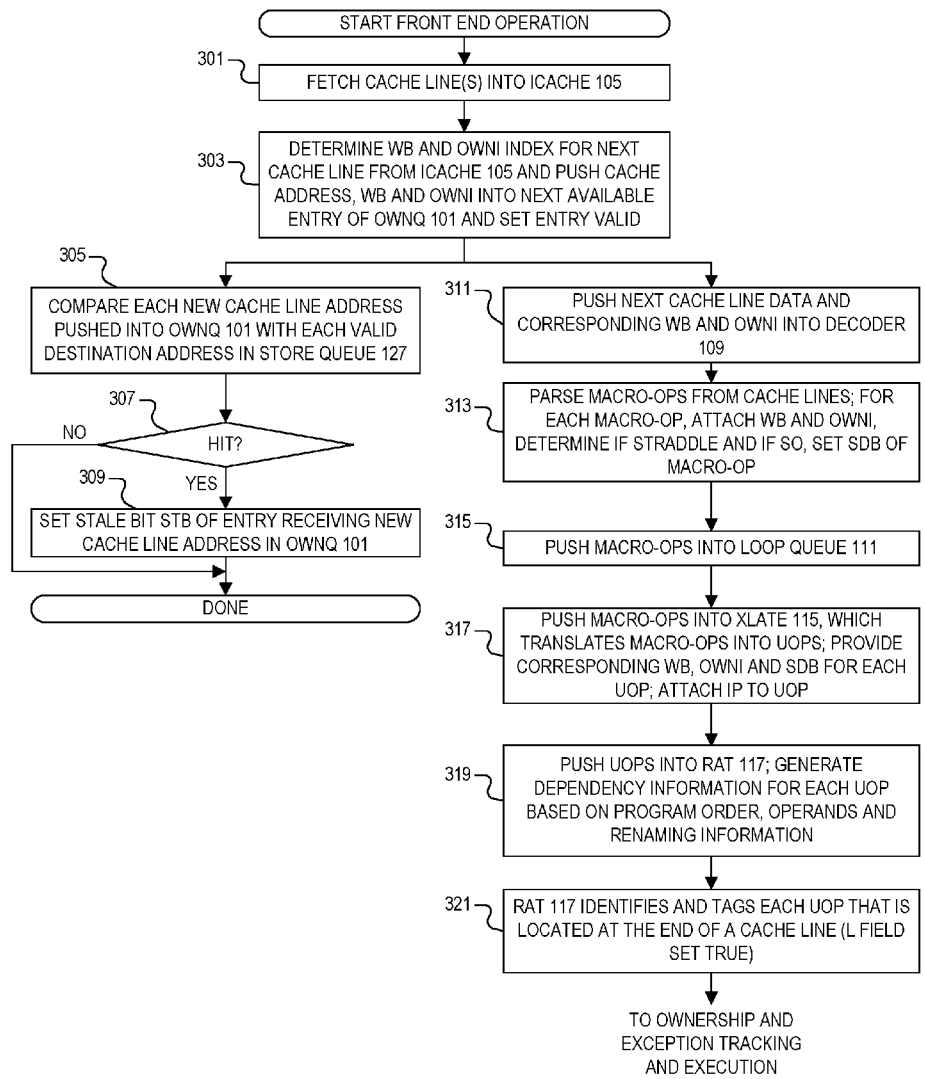
FIG. 3 is a flowchart diagram illustrating operation of the processing front end of FIG. 1 according to one embodiment.

FIG. 3 is a flowchart diagram illustrating operation of the processing front end 104 according to one embodiment. At first block 301, cache lines (e.g., from the system memory 102) are fetched and stored in the icache 105, such as by the hardware prefetch engine 103. At next block 303, a wrap bit WB and index value OWNI are determined for the next cache line, such as by the fetch unit 107, and this information along with the cache address is pushed into the next available entry of the OWNQ 101. The fetch unit 107 also sets the valid bit for the entry in the OWNQ 101. As previously described, the OWNQ 101 may be implemented as a circular buffer in which the valid bits are used to determined the valid entries currently in the OWNQ 101 at any given time. In an alternative embodiment, push and pop pointers may be used.

When a new cache address is pushed into the OWNQ 101 as shown at next block 305, the new address is compared with each valid destination address located in the store queue 127. If there is a hit as determined at next query block 307, then the stale bit STB of the entry receiving the new cache line address is set at block 309. After the STB value is set, or otherwise if there is no hit, then operation is completed for the OWNQ 101.

Meanwhile, when a new cache line address is pushed into the OWNQ 101, the corresponding cache line data along with the WB and OWNI are pushed into the decoder 109 as shown at block 311. At next block 313, the decoder 109 parses out the macro-ops within the cache lines, and for each macro-op, attaches the corresponding WB and OWNI of the cache line from which the macro-op was located. Furthermore, the decoder 109 determines if the macro-op straddled two cache lines meaning that it started on one cache line and ended in the next sequential cache line. If so, then the straddle bit SDB of the macro-op is set. At this point, each macro-op includes WB, OWNI and STB values.

The macro-ops are then pushed into the loop queue 111 as shown at block 315, and then into the XLATE 115 as shown at 317, in which the macro-ops are translated into corresponding uops. As previously described, each macro-op is converted into one or more uops. Each uop is provided with the WB, OWNI and SDB values of the macro-op from which is was translated. At this point, the IP (instruction pointer) of each uop is also stated as being attached to the uop. Alternatively, the IP may be attached to each uop at blocks 319 or 321. In any of these configurations, the IP is ultimately provided with each uop pushed into the ROB 121. At next block 319, the uops are pushed into the RAT 117, which generates dependency information for each uop based on program order, operands and renaming information. At next block 321, the RAT 117 identifies and tags each uop that is located at the end of a cache line, such as by setting true an L field of the instruction as previously described for one embodiment. This information is thus passed to the ROB 121 and provided in the corresponding ROB entry, so that the retire module 135 is able to identify when the instructions of each cache line have been processed. The uops are then issued from the RAT 117 for execution as well as for ownership and exception handling as further described herein.

Figure 4:
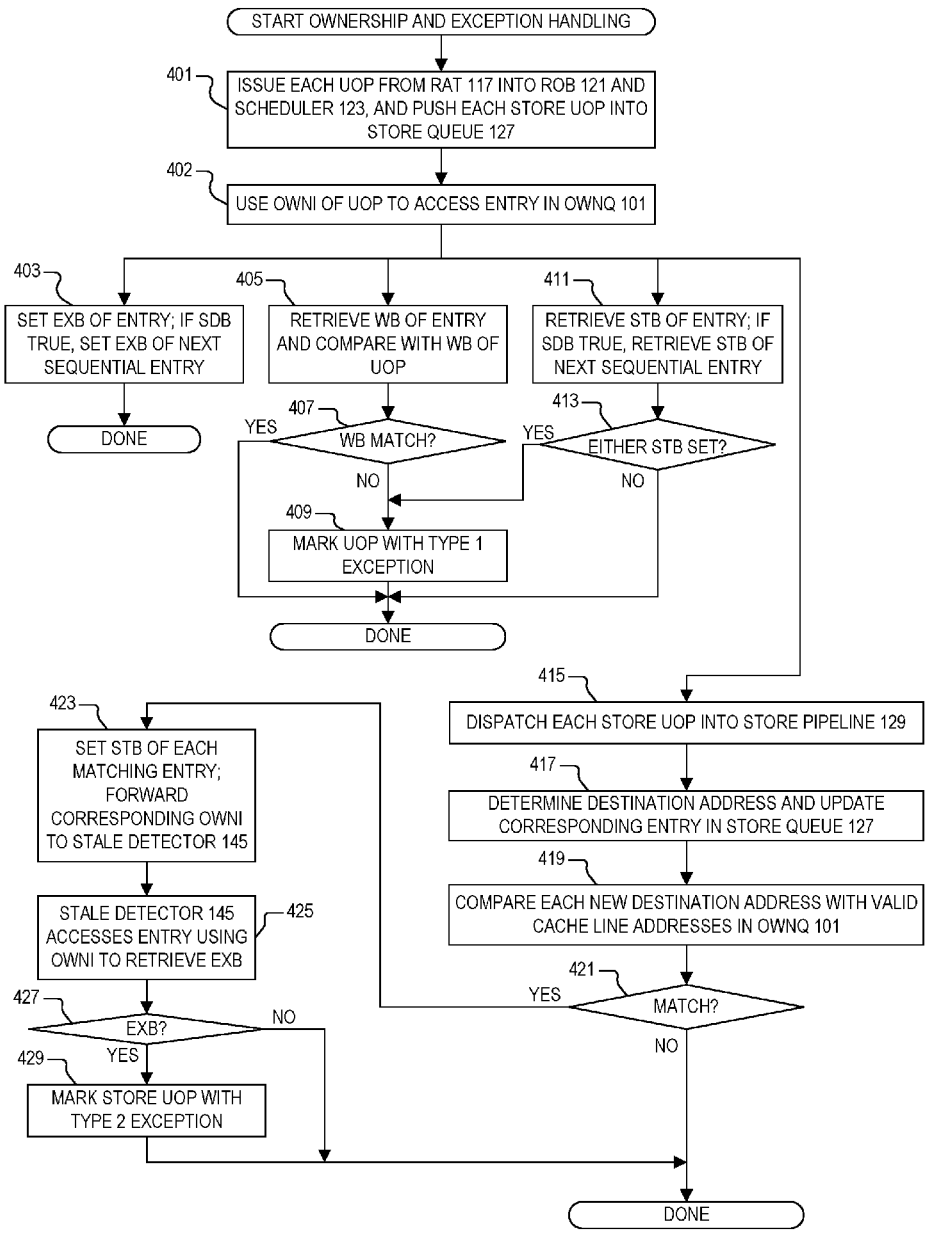
FIG. 4 is a flowchart diagram illustrating ownership and exception handling according to one embodiment.

FIG. 4 is a flowchart diagram illustrating ownership and exception handling according to one embodiment. At first block 401, the RAT 117 issues each uop into the ROB 121 and the scheduler 123. In addition, each store uop is further pushed into the store queue 127. Operation then proceeds to block 402 in which the OWNI from each uop being issued from the RAT 117 is used to access the corresponding entry within the OWNQ 101. This function was previously described for multiple blocks of the processor 100, but may be centralized into common logic. Operation then proceeds to three separate blocks 403, 405 and 411 when the uops are issued from the RAT 117.

At block 403, the executing bit EXB of that entry is set. Also, if the SDB of the uop is also true, then the next sequential entry in the OWNQ 101 is also accessed and the executing bit EXB of that entry is set as well. In this manner, the cache line(s) from which the uop was derived are marked in the OWNQ 101 as executing, meaning that at least one uop from the cache line(s) is being issued for execution. After one or both the EXB's are set, operation is completed for this branch of the flowchart.

At block 405, the corresponding wrap bit WB of the entry is retrieved and compared with the WB from the uop. If the WBs from the uop and the corresponding entry in the OWNQ 101 do not match as determined at next query block 407, the operation proceeds to block 409 in which the uop is marked with the type 1 exception (e.g., by setting T1 true). After marking (mismatch), or after the WB's are found to match, operation is completed for this branch of the flowchart.

At block 411, the stale bit STB of the accessed entry of the OWNQ 101 is retrieved. Also, if the SDB value of the uop is true, then the STB of the next sequential entry of the OWNQ 101 is also retrieved. If either STB is set, then operation proceeds to block 409 in which the uop is marked with the type 1 exception (e.g., by setting T1 true). After marking the uop for the type 1 exception in block 409, or if neither STB is set, then operation is completed for this branch of the flowchart.

Each uop issued to the scheduler 123 may eventually be dispatched into a corresponding one of the execution units 125 when ready to be executed as previously described. This includes dispatching store uops into the store pipeline 129 as shown at block 415. At next block 417, the store pipeline 129 determines the destination address for the store uop and updates the corresponding entry within the store queue 127. At next block 419, when each new destination address is determined, it is compared with the valid cache line addresses in the OWNQ 101. If the new destination address does not match any of the valid cache line addresses in the OWNQ 101, then operation is completed.

When the new destination address matches at least one valid cache line address, then operation proceeds to block 423 in which the STB of each matching entry is set. Furthermore, the OWNI index of the matching entry is forwarded to the stale detector 145. At next block 425, the stale detector 145 uses the provided OWNI index to access the corresponding entry to retrieve the executing bit EXB of that entry. At next query block 427, of the EXB is determined to be true, then operation proceeds to block 429 in which the colliding store uop is marked with a type 2 exception (e.g., by setting T2 true). If EXB is false as determined at block 427, or after marking the store uop at block 429, operation is completed.

Figure 5:
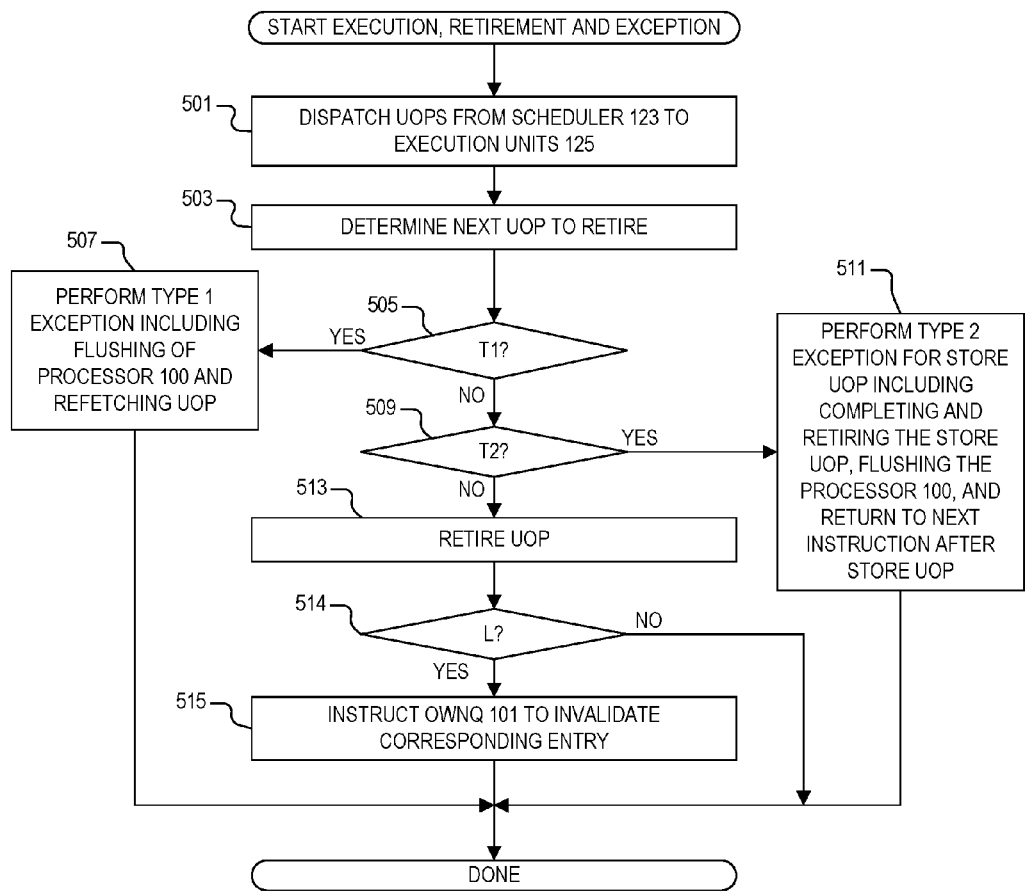
FIG. 5 is a flowchart diagram illustrating execution, retirement and exception processing according to one embodiment.

FIG. 5 is a flowchart diagram illustrating execution, retirement and exception processing according to one embodiment. At first block 501, the uops are dispatched from the scheduler 123 to the execution units 125 as previously described. The dispatched uops may execute, but this may not be the case under certain operating conditions. At next block 503, the retire module 135 of the ROB 121 identifies the next uop to retire. At next query block 505, it is determined (e.g., by the retire module 135) whether the T1 field of the uop to retire has been set true. If so, operation proceeds to block 507 at which the type 1 exception is performed including flushing of the processor 100. Also, the uop causing the type 1 exception is re-fetched from the icache 105 as previously described. Operation of exception handling is then completed.

If T1 is not true but T2 is determined to be true (e.g., by the retire module 135) as determined at next query block 509, then operation proceeds instead to block 511 at which the type 2 exception is performed in which the store uop is allowed to complete and retire, and the processor 100 is flushed. Operation is restarted at the next instruction in the icache 105 after the store uop that initiated the exception. Operation of exception handling is then completed. If neither T1 nor T2 are true, then the uop is allowed to retire at block 513. If the L field of the uop is set true indicating that the uop is the last uop of a cache line as determined at next block 514, then the retire module 135 instructs the OWNQ 101 to invalidate the corresponding entry at next block 515, and operation is completed. Invalidation may be performed by marking the entry as invalid, or popping the entry from the stack of entries in the OWNQ 101. If the L field is false, then operation is completed after the instruction is retired.

The foregoing description has been presented to enable one of ordinary skill in the art to make and use the present invention as provided within the context of a particular application and its requirements. Although the present invention has been described in considerable detail with reference to certain preferred versions thereof, other versions and variations are possible and contemplated. Various modifications to the preferred embodiments will be apparent to one skilled in the art, and the general principles defined herein may be applied to other embodiments. For example, the circuits described herein may be implemented in any suitable manner including logic devices or circuitry or the like.

Those skilled in the art should appreciate that they can readily use the disclosed conception and specific embodiments as a basis for designing or modifying other structures for carrying out the same purposes of the present invention without departing from the spirit and scope of the invention. Therefore, the present invention is not intended to be limited to the particular embodiments shown and described herein, but is to be accorded the widest scope consistent with the principles and novel features herein disclosed.

What is claimed is:

1. A processor that determines memory ownership on a cache line basis for detecting self-modifying code including code with looping instructions, comprising:
   an ownership queue that comprises a plurality of entries for determining memory ownership on a cache line basis;
   a fetch system that provides cache line data of a plurality of cache lines to a processing front end, that determines an ownership index and a wrap bit for each of said plurality of cache lines, and that enters a corresponding cache line address, a corresponding ownership index and a corresponding wrap bit into an entry of said ownership queue for each of said plurality of cache lines, wherein said ownership index uniquely identifies each of a complete set of said plurality of entries and wherein said wrap bit distinguishes between sequential entries of said ownership queue having a common ownership index;
   wherein said processing front end translates said cache line data from said plurality of cache lines into a plurality of microinstructions and includes with each microinstruction an ownership index and a wrap bit that were determined for a corresponding to one of said plurality of entries of said ownership queue, and wherein said processing front end then issues each microinstruction for execution;
   an overwrite detector that uses said ownership index provided with a microinstruction being issued to read a corresponding wrap bit of a corresponding entry of said ownership cache having the same ownership index, and that causes said microinstruction being issued to be marked with a first exception when said wrap bit of said corresponding entry does not match said wrap bit of said microinstruction being issued; and
   an execution system that performs said first exception when a microinstruction that is marked with the first exception is ready to retire.

2. The processor of claim 1, wherein said first exception causes said execution system to flush said processor, to prevent an instruction that caused said first exception from retiring, and to cause said fetch system to re-fetch from an instruction cache said instruction that caused said first exception.

3. The processor of claim 1, wherein said processing front end comprises:
- a decoder that parses said cache line data into a plurality of macroinstructions;
- a translator that translates said plurality of macroinstructions into said plurality of microinstructions; and
- a loop queue coupled between said decoder and said translator for storing said plurality of macroinstructions from said translator for processing by said translator.

4. The processor of claim 3, wherein said processing front end further comprises a loop detector, coupled to said translator and said loop queue, that detects a loop comprising a sequence of macroinstructions at least partially within said loop queue and that causes said translator to repeatedly retrieve and translate said sequence of macroinstructions from said loop queue until said loop is completed.

5. The processor of claim 4, wherein after said loop is detected, said fetch system continues to provide said cache line data to said decoder and to fill entries of said ownership queue until said loop is completed or until said decoder is full.

6. The processor of claim 3, wherein:
- said decoder includes with each macroinstruction a corresponding ownership index and a corresponding wrap bit; and
- wherein said translator translates said each macroinstruction into at least one microinstruction, and further includes said corresponding ownership index and said corresponding wrap bit with each of said at least one microinstruction.

7. The processor of claim 1, wherein said fetch system determines said ownership index as a binary count value that is incremented for each entry entered in said ownership queue for a total count that is at least a total number of entries of said ownership queue, and wherein a most significant bit of said ownership index comprises said wrap bit.

8. The processor of claim 1, wherein said wrap bit toggles between first and second values after each iteration of a complete set of said plurality of entries of said ownership queue.

9. The processor of claim 1, further comprising:
- said execution system further determines a destination address for each issued store microinstruction;
- a first comparator that compares each cache line address being entered into an entry of said ownership queue with each destination address that has already been determined and that sets a stale bit of said entry when a match is found;
- a second comparator that compares each destination address when determined by said execution system with each cache line address of valid entries stored in said ownership queue and that sets a stale bit of each matching entry; and
- a first stale detector that uses said ownership index provided with a microinstruction being issued to read a stale bit of a corresponding entry of said ownership cache, and that causes said microinstruction being issued to be marked with said first exception when said stale bit of said corresponding entry is set.

10. The processor of claim 9, further comprising:
- said processing system further configured to set a straddle bit provided with each microinstruction that was derived from cache line data that straddled two cache lines in said ownership queue; and
- wherein said first stale detector is further configured to read a stale bit of a next sequential entry after said corresponding entry of said ownership cache when a straddle bit included with said microinstruction being issued is set, and wherein said first stale detector causes said microinstruction being issued to be marked with said first exception when said stale bit of said next sequential entry after said corresponding entry of said ownership cache is set.

11. The processor of claim 10, further comprising:
- said processing system further using said ownership index provided with a microinstruction being issued to access a corresponding entry in said ownership queue to set an executing bit of said corresponding entry;
- a second stale detector that evaluates an executing bit of each said matching entry determined by said second comparator, and when any executing bit of any matching entry is set, that causes a store microinstruction that corresponds with said determined destination address to be marked to invoke a second exception to be performed by said execution system; and
- wherein said execution system performs said second exception when a store microinstruction that is ready to retire is marked to invoke said second exception, and wherein said second exception causes said execution system to allow said store microinstruction marked to invoke said second exception to retire, to flush said processor, and to cause said fetch system to retrieve an instruction pointer to fetch a microinstruction from an instruction cache that follows said store microinstruction.

12. A method of determining memory ownership on a cache line basis for detecting self-modifying code including code with looping instructions, comprising:
- fetching a plurality of cache lines wherein each cache line comprises a cache line address and cache line data, and for each of the plurality of cache lines, determining an ownership index that uniquely identifies each of a complete set of a plurality of entries of an ownership queue, and determining a wrap bit that distinguishes between sequential entries of the ownership queue having a common ownership index;
- pushing each cache line, a corresponding ownership index and a corresponding wrap bit into one of a plurality of entries of an ownership queue;
- translating the cache line data from the plurality of cache lines into a plurality of microinstructions, and including with each translated microinstruction an ownership index and a wrap bit that were determined for a corresponding one of the plurality of entries of the ownership queue that stores a cache line from which the translated microinstruction was derived;
- issuing each microinstruction for execution, and using an ownership index provided with each microinstruction being issued to read a corresponding wrap bit of a corresponding entry of the ownership cache having the same ownership index;
- marking each microinstruction being issued with a first exception when the wrap bit of the corresponding entry of the ownership queue does not match the wrap bit including with the microinstruction being issued; and
- performing a first exception when a microinstruction is marked to invoke the first exception is ready to retire.

13. The method of claim 12, wherein said performing a first exception comprises flushing the processor, preventing the microinstruction that invoked the first exception from retiring, and re-fetching the microinstruction that invoked the first exception.

14. The method of claim 12, further comprising:
parsing the cache line data into a plurality of macroinstructions by a decoder;
storing the plurality of macroinstructions into a loop queue; and
translating the plurality of macroinstructions from the loop queue into the plurality of microinstructions.

15. The method of claim 14, further comprising:
detecting a loop comprising a sequence of macroinstructions at least partially located within the loop queue; and
repeatedly retrieving and translating the sequence of macroinstructions from the loop queue until the loop is completed.

16. The method of claim 15, wherein said fetching and pushing comprises continuously fetching and pushing to fill entries of the ownership queue until the loop is completed or until a decoder is full.

17. The method of claim 12, further comprising:
including with each macroinstruction a corresponding ownership index and a corresponding wrap bit; and
for each microinstruction derived from a macroinstruction, including the corresponding ownership index and the corresponding wrap bit of the macroinstruction.

18. The method of claim 12, wherein:
said determining an ownership index comprises determining the ownership index as a binary count value that is incremented for each entry entered in the ownership queue for a total count that is at least a total number of entries of the ownership queue; and
wherein said determining a wrap bit comprises determining the wrap bit as a most significant bit of the ownership index.

19. The method of claim 12, wherein said determining a wrap bit comprises toggling between first and second values after each iteration of a complete set of the plurality of entries of the ownership queue.

20. The method of claim 12, further comprising:
determining a destination address for each issued store microinstruction;
comparing each cache line address being entered into an entry of the ownership queue with each destination address that has already been determined and setting a stale bit of the entry when a match is found;
comparing each destination address when determined with each cache line address of valid entries stored in the ownership queue and setting a stale bit of each matching entry; and
using the ownership index provided with a microinstruction being issued to read a stale bit of a corresponding entry of the ownership cache, and marking the microinstruction being issued with the first exception when the stale bit of the corresponding entry is set.

21. The method of claim 20, further comprising:
setting a straddle bit provided with each microinstruction that was derived from cache line data that straddles two cache lines in the ownership queue; and
reading a stale bit of a next sequential entry after the corresponding entry of the ownership cache when a straddle bit included with the microinstruction being issued is set; and
marking the microinstruction being issued with the first exception when the stale bit of the next sequential entry after the corresponding entry of the ownership cache is set.

22. The method of claim 21, further comprising:
using the ownership index provided with a microinstruction being issued to access a corresponding entry in the ownership queue and setting an executing bit of the corresponding entry;
reading an executing bit of each matching entry determined when comparing each destination address, when determined, with each cache line address of valid entries stored in the ownership queue, and when any executing bit of any matching entry is set, causing a store microinstruction that corresponds with the determined destination address to be marked to invoke a second exception to be performed; and
performing the second exception when a store microinstruction that is ready to retire is marked to invoke the second exception, including:
allowing the store microinstruction marked to invoke the second exception to retire;
flushing the processor; and
retrieving an instruction pointer to fetch a microinstruction from an instruction cache that follows the store microinstruction.

* * * * *